US012186977B2

(12) United States Patent
Zitelli (10) Patent No.: US 12,186,977 B2
(45) Date of Patent: Jan. 7, 2025

(54) 3D PRINTING APPARATUS OF THE BOTTOM-UP PHOTO-CURING TYPE WITH VARIABLE REFRACTION INDEX ROTARY GLASS AND METHOD

(71) Applicant: AXTRA3D INCORPORATION, Dover, DE (US)

(72) Inventor: Gianni Zitelli, Padua (IT)

(73) Assignee: AXTRA3D INCORPORATION, Dover, DE (US)

(*) Notice: Subject to any disclaimer, the term of this patent is extended or adjusted under 35 U.S.C. 154(b) by 80 days.

(21) Appl. No.: 17/801,052

(22) PCT Filed: Feb. 22, 2021

(86) PCT No.: PCT/IT2021/050038
§ 371 (c)(1),
(2) Date: Aug. 19, 2022

(87) PCT Pub. No.: WO2021/166006
PCT Pub. Date: Aug. 26, 2021

(65) Prior Publication Data
US 2023/0083095 A1 Mar. 16, 2023

(30) Foreign Application Priority Data
Feb. 21, 2020 (IT) .................. 102020000003647

(51) Int. Cl.
*B29C 64/124* (2017.01)
*B29C 64/171* (2017.01)
(Continued)

(52) U.S. Cl.
CPC .......... *B29C 64/124* (2017.08); *B29C 64/171* (2017.08); *B29C 64/223* (2017.08);
(Continued)

(58) Field of Classification Search
CPC ... B29C 64/124; B29C 64/223; B29C 64/232; B29C 64/245; B29C 64/241
See application file for complete search history.

(56) References Cited

U.S. PATENT DOCUMENTS

2016/0096331 A1\* 4/2016 Linnell .................. B33Y 10/00
264/494
2019/0009470 A1\* 1/2019 Zitelli ................... B29C 64/135

FOREIGN PATENT DOCUMENTS

| EP | 3356122 A1 | 8/2018 |
|---|---|---|
| WO | 2019/014098 A1 | 1/2019 |
| WO | 2019/186611 A1 | 10/2019 |

OTHER PUBLICATIONS

International Search Report and Written Opinion issued on May 26, 2021 of corresponding International Application No. PCT/IT2021/050038, 14 pgs.

(Continued)

*Primary Examiner* — Edmund H Lee
(74) *Attorney, Agent, or Firm* — Maier & Maier, PLLC (57) ABSTRACT

A 3D printing apparatus of the bottom-up photo-curing type, including a tank containing a liquid photo-curing material and at least one source of a radiation designed to obtain the photo-curing of the liquid photo-curing material, the bottom of the tank including an elastic membrane of non-stick material and transparent to the radiation of the light source, the tank supported on a support plate, the support plate includes, in the portion below the bottom of the tank, a mobile support element, which is able to move by translating and/or rotating in the plane where it is positioned with one or more perforated or lowered portions. The embodiments also relate to a method of using the apparatus for 3D printing.

7 Claims, 5 Drawing Sheets

(51) Int. Cl.
*B29C 64/223* (2017.01)
*B29C 64/232* (2017.01)
*B29C 64/241* (2017.01)
*B29C 64/245* (2017.01)
B33Y 30/00 (2015.01)
B33Y 40/00 (2020.01)

(52) U.S. Cl.
CPC .......... *B29C 64/232* (2017.08); *B29C 64/241* (2017.08); *B29C 64/245* (2017.08); *B33Y 30/00* (2014.12); *B33Y 40/00* (2014.12)

(56) References Cited

OTHER PUBLICATIONS

Italian Search Report and Written Opinion issued on Nov. 3, 2020 of corresponding Application No. 102020000003647, 11 pgs.

* cited by examiner

Fig. 5

3D PRINTING APPARATUS OF THE BOTTOM-UP PHOTO-CURING TYPE WITH VARIABLE REFRACTION INDEX ROTARY GLASS AND METHOD

FIELD

This invention relates to a 3D printing apparatus of the bottom-up photo-curing type with variable refraction index rotary glass and a relative method of use.

More specifically, the invention relates to an innovative method of producing three-dimensional objects, by means of a process of photo-curing photosensitive materials, which allows three-dimensional objects to be produced according to a sequential formation process, considerably increasing the speed, the precision and the mechanical qualities of the final product, compared with what can be obtained by means of prior art methods.

The invention relates to the field of three-dimensional printing, commonly referred to as 3D printing, and in particular to the technology of 3D printing by photo-curing, that is to say, curing of a particular type of polymer by exposure to light radiation.

BACKGROUND

It is known that there are two basic technologies in the field of 3D printing by photo-curing: stereolithographic printing, in which a laser emitting around 400 nm is used to solidify a photo-curing polymer in the liquid state, which is contained in a special tank, by means of the emitted beam; and DLP (Digital Light Processing) printing, in which a photo-curing polymer (or photo-curing liquid resin), also in a liquid state in a tank, is exposed to the light radiation emitted by a device similar to a projector.

According to both of these technologies, the printing process proceeds by making one layer after another, that is to say, by solidifying a first layer adhering to a support plate (or extraction plate) and then a second layer adhering to said first layer and so on until the formation of the complete object. According to this technology, therefore, the data representing the three-dimensional object to be produced is organised as a series of two-dimensional layers representing cross-sections of the object.

According to the Bottom-Up process, which is applied to both SLA and DLP machines, the extraction plate of the object moves from the bottom upwards, with a layer-by-layer tilting motion.

In essence, the process of forming the three-dimensional object is as follows:

a software subdivides the 3D model, supplied as input for the printing, into an ordered succession of layers, the thickness of which is determined as a function of the technology adopted, the opacity of the polymer, the quantity of catalyst, the degree of precision to be achieved and the characteristics of the machine in use, usually between 50 and 200 microns, but, in any case, a succession of a discrete and finite number of layers;

a support plate, also known as an extraction plate, made of a material which facilitates the gluing of the first polymer layer onto itself, is brought to a predetermined distance from the first layer and waits for the light beam (SLA or DLP) to solidify the first layer; it is then raised by a sufficient distance so that the newly formed layer detaches from the bottom of the tank (usually about 1 mm) and then lowered by the same distance, minus the distance set for the formation of the second layer, and so on until the entire object is formed.

The resulting back-and-forth movement, also known as a tilting movement, has two main purposes: it allows the newly formed layer to detach itself from the bottom of the tank, and at the same time it allows a new quantity of un-polymerised liquid resin to interpose itself between the newly formed layer and the bottom of the vessel, to allow the renewal of material still in a liquid state under the already solidified layer, for the curing and the formation of the next layer.

A no less important issue concerns the characteristics of the resin collection system, the so-called tank, which has the task not only of containing the liquid polymer from which the three-dimensional printed object is obtained by photo-curing, but also that of facilitating the formation and detachment of the newly formed layer, and of favouring its bonding to the extraction plate, without the mechanical strength compromising its integrity.

By analysing the characteristics of the solutions according to the prior art, it is possible to schematise the bottom-up collection systems, both for the DLP and SLA technology, as follows:

resin container, with hollow bottom;
material transparent to light radiation, for covering the bottom;
membrane of non-stick material covering the transparent material.

A hole is formed, usually in the centre of the collection system, to allow the passage of the light beam which will trigger the photo-curing phenomenon; the hole is then covered by a glass which has excellent characteristics of transparency to light radiation (in order not to lose incident light power), such as quartz and borosilicate. Finally, of course, the most important part of allowing the process to run smoothly involves covering the glass with a membrane of non-stick material, to allow the first layer to attach to the extraction plate and the subsequent layers to join together in sequence.

Failure to do so would result in the newly formed layer precipitating to the bottom of the tank, interrupting the formation process and causing the print routine to fail.

The following description investigates the limiting effects of this technology, which make the production of the object very slow (up to hours per centimetre), very unstable and with a capacity to make small objects.

The first limitation in adopting bottom-up photo-curing technologies is that of the non-stick capacity of the membrane placed over the bottom glass.

In fact, as mentioned above, this type of three-dimensional printing is based on the ability of the newly formed layer to bind, in the first layer, to the extraction plate, and, in subsequent layers, to the layers preceding it. If, however, the mechanical strength imposed by the lower membrane is greater than the cohesive force of the upper membrane, the cured layer will inevitably remain at the bottom of the tank, interrupting the process of creating the three-dimensional printed object.

Apart from the latest innovative techniques, such as controlling the inhibition layer with oxygen or self-lubricating materials, there are two well-known solutions that are widely used for the construction of the non-stick membrane placed above the bottom glass:

the use of materials such as Teflon or polytetrafluoroethylene, also known as PTFE;
the use of silicone-based materials, such as polydimethylsiloxane, also known as PDMS.

Firstly, Teflon and PTFE are particularly suitable for 3D printing applications, since they have a high thermal capacity (which is important in controlling the exothermic reaction of photo-curing) and at the same time a very low coupling (almost inert behaviour) with the photo-curing resins, which are particularly aggressive/reactive with other materials.

The main drawback which makes Teflon and PTFE almost inapplicable (except for particular applications with a very low cross-sectional area of the object to be printed) is the absolute lack of elastic capacity of these materials. In particular, according to this prior art technology, a Teflon sheet (with a thickness of between 125 and 250 microns) is usually placed on the glass sheet at the bottom of the tank, with no air between the Teflon sheet and the glass sheet. Under these conditions, the Teflon sheet tends to adhere perfectly to the glass sheet, inevitably becoming a single body with the bottom of the tank. As will be explained later, this condition of rigidity generates, between the newly cured object and the Teflon, a phenomenon known as the suction cup effect, which causes a mechanical stress which tends (especially for wedge-shaped objects) to plastically deform the Teflon, making it impossible to continue the printing process and/or reuse the tank and, more importantly, the enormous mechanical stress generated during the tilting phase tends to "break" the object, making the printing success random and non-repeatable.

PDMS and silicones, on the other hand, are the most widely used materials, as they respond to a condition of compromise between chemical interaction and mechanical stress.

Usually, these materials are poured and then glued to the bottom of the tank and, using special techniques, levelled to ensure the planarity between the extraction plate and the bottom of the tank (to ensure the formation of a layer without deformations).

These materials are preferred because the greater surface "tenderness" of the non-stick membrane placed above the bottom glass allows the reduction of the suction cup effect, as will be explained below.

The main drawback which limits the application of these materials and makes stabilisation of the printing process extremely complex is due to their limit of applicability, that is to say, their lower thermal resistance and the higher chemical coupling with the resin.

In fact, the silicone material tends to absorb the resin more easily and the exothermic reaction produced by polymerisation (locally exceeding 400° with some resins) tends to crystallise the PDMS, with the consequence that the subsequent movement of the extraction plate generates a mechanical stress which tends to "weaken", and therefore whiten, the support material (a phenomenon known as "white shadow"). Once again this loss of capacity makes the printing process unstable.

In this context, a particularly innovative technology has been described in patent EP3356122, relating to a method and a device for forming three-dimensional objects by bottom-up photo-curing of a photo-curing liquid polymer exposed to a radiation, in which a self-lubricating substrate is used, that is to say, a membrane, which is transparent to the photo-curing radiation, covered by a layer of liquid lubricant, released gradually from said membrane.

The second limitation in the adoption of bottom-up photo-curing technologies is the so-called suction cup effect, which occurs between the surface of the object and that of the membrane of non-stick material which covers the transparent sheet to light radiation placed at the bottom of the tank.

It is immediately apparent how the conditions for this phenomenon to occur are in place. In fact, the layer is immersed in the resin until it is at a distance s (thickness of the nth layer) from the non-stick membrane (both surfaces are coplanar and perfectly flat precisely to give precision to the layers to be formed); a new layer is then generated by photo-curing. The absence of air in fact creates a vacuum between the two surfaces, which are surrounded by a higher viscosity liquid, in particular the larger the surface area of the two surfaces in contact and the more rigid the supports that interclude the layer being formed; the mechanical stress suffered by the system and consequently by the newly formed layer (only a few tenths of a millimetre thick) is enormous, with the risk of tearing the newly solidified layer, which will not stick to the upper surface, leading to an interruption in the printing process.

In order to reduce the effects of this phenomenon, the surface area of the extraction plate and the objects to be created is sufficiently small (usually with technologies of this type, objects of approximately 4×4, 5×5 centimetres are created) and at the same time the speed at which the extraction plate rises during the tilting phase is extremely low, which significantly increases the printing time (generally speaking, the tilting time is approximately 40% of the total time).

The best solution, however, is to use a membrane of non-stick material with a certain degree of flexibility to generate a peeling phenomenon. In particular, the use of a silicone-based membrane, which has a high elastic capacity, and the simultaneous removal (or distancing) of the rigid bottom of the tank, allows the activation of the peeling phenomenon and, therefore, a significant reduction in the suction effect.

However, when printing with a "free-field" elastic membrane, three problems arise:
- the phenomenon of the "chord", due to gravity, generates a distortion of the layer and a loss of precision,
- the lack of compression of the newly formed layer between two rigid layers weakens the adhesion of the object to the extraction plate, and
- the "exfoliation" effect of the object is increased, again due to the lack of compression between two rigid planes.

According to an alternative technique, the elastic membrane is placed on a rigid support. This technique would theoretically be the ideal solution to the immediate solving of the problem of the suction cup effect, at the same time without running into the problems of the "free field" membrane system, since the bottom of the tank would provide its contribution of reference and compression, whilst at the same time maintaining the flatness of the membrane and simultaneously the elastic membrane, free to "follow" the detachment of the object, would reduce the suction cup effect.

The silicone material would also benefit, reducing the mechanical stress to which the crystallising portions of the material are subjected by the thermal effect.

In reality, the membrane itself, resting on the rigid support, and removing the air separating them, tends to stick to it, effectively transferring the suction effect between the two media, and cancelling out all the benefits mentioned above.

In this context, a particularly innovative solution has been described in patent WO2019186611, relating to a 3D printing apparatus of the bottom-up photo-curing type, with an elastic membrane resting on a rigid support, consisting of the perforated bottom of the tank and the glass sheet covering the hole, wherein the rigid support is connected to means for generating a tilting movement with respect to the rest of the tank, and wherein an arrangement (such as, for example, a pressure/decompression system, or layer of adhesive component, between the rigid support and the elastic membrane) is applied at the interface between the rigid support and the elastic membrane, which results in an adherence between the rigid support and the elastic membrane higher than that between the elastic membrane and the newly formed layer, thereby achieving the advantage of a high compression and precision of the layer being formed, since the rigid system on which the elastic membrane rests makes it possible to overcome the chord problem which would be generated by an elastic membrane without reference, at the same time counteracting the development of the suction cup effect, the rigid support being made to rotate around a hinge axis, inducing a peeling phenomenon between the rigid support and the elastic membrane.

Another innovative solution is disclosed by WO2019/014098, according to which a 3D printing apparatus includes a tank holding a photo-curing liquid polymer, a transparent membrane forming a bottom surface of the tank and a circular-shaped disk is disposed below the membrane, and is supported by a frame that has a radiation-transparent printing window. The liquid polymer is cured into desired shapes by exposure to radiation as the membrane is rotated about an axis. The rotation of the membrane causes a first region thereof to be rotated out of the printing window and a second region thereof to be rotated into the printing window. A light source projects the radiation through the printing window, through the second region of the membrane, into the photo-curing liquid polymer and onto a focal plane in the photo-curing liquid polymer, thereby curing a portion of the photo-curing liquid polymer.

In conclusion, all the technologies proposed according to the prior art provide for a "containment" of the suction cup effect, and therefore a reduction in the mechanical stress induced, which are elements which guarantee an increase in the speed of production of the objects and an increase in the repeatability performance of the process and of the printing quality.

Finally, a further problem has recently begun to be perceived as significant, which was not previously felt, because the inherent inaccuracies of 3D printing systems did not allow a polymerisation resolution such as to show this phenomenon on the surfaces, and which has recently emerged by virtue of the high technological and chemical accuracy and the extreme precision of process characterisation that have been achieved.

This phenomenon is called aliasing and consists in the fact that objects generated by digital systems are represented by a plurality of minimal units, the smaller they are the higher is the resolution, which on the surface of the objects can be perceived, to the detriment of the smoothness of the surface itself. This phenomenon is also known in the field of 2D digital printing (and more generally in the two-dimensional digital reproduction of text or images), wherein the corresponding minimum units are called pixels and wherein the printing resolution depends on the size of the pixel, and where an edge (that is, an approximation of the edge of the image) is generated, the size of which is equal to the size of the pixels.

In fact, as is well known, 3D printing systems use light sources, generally lasers, DLP projectors or LCDs (Liquid Crystal Displays) with predefined wavelengths, to cure the photopolymerising resin. By using laser systems, the production of objects is particularly accurate in terms of the quality of the surface produced, but they are by definition non-isotropic (in terms of mechanical behaviour), extremely slow in production and time-varying, not only depending on the height of the object but also on the quantity of objects printed simultaneously by the same machine. In order to overcome these problems, DLP and LCD type projection systems have been introduced in the prior art, which allow the instantaneous curing of an entire layer of the object to be printed, thus guaranteeing greater mechanical performance, higher speed and invariant time.

In fact, when using DLP or LCD type systems, it makes sense to talk about a kind of XY resolution of the printed object, which is equal to the size of the pixel actually projected. In particular, in the DLP systems, the greater the projection distance (and therefore the print area), the larger will be the size of the pixels projected, and consequently the resolution of the printed object will be lower.

SUMMARY

In this context, the solution according to the invention proposes to remove the suction cup effect, and no longer only to contain or reduce it, at the same time proposing to reduce the aliasing effect, without introducing projection errors (image compression process), by a linear and discrete value equal to n times, with n equal to the number of refractive indices that will be introduced.

These and other results are obtained according to the invention by proposing an 3D printing apparatus of the bottom-up photo-curing type, comprising a tank for forming objects by photo-curing, said tank containing liquid photo-curing material, the bottom of the tank being formed by an elastic membrane of non-stick material, under the tank being arranged a supporting disc, with the possibility of rotation about its centre, which in particular can be made entirely of glass transparent to the radiation used for the photo-curing, preferably borosilicate glass and quartz, with one or more portions perforated or lowered with respect to the upper surface of the supporting disc, of a size equal to the size of the printing area, or alternating, at regular angular intervals around its centre, a portion of glass of a size equal to the size of the printing area and a portion perforated or lowered with respect to the top surface of the supporting disc, again of a size equal to the size of the printing area, the supporting disc being able to comprise more than one portion of glass and a same number of perforated or lowered portions.

Moreover, with particular reference to combating the aliasing phenomenon, the 3D printing apparatus of the bottom-up photo-curing type according to the invention is provided with a rotating support disc having at least two glass portions, preferably at least three glass portions, and as many perforated or lowered glass portions, each glass portion having a different refractive index, with a value equal to the shift of the incident beam equal to the size of the pixel divided by the number of active glasses (resolution/N).

The purpose of the invention is therefore to provide a 3D printing apparatus of the bottom-up photo-curing type with a rotary glass with variable refractive index and a method of using it which enables the limitations of devices according to the prior art to be overcome and the technical results described above to be obtained.

A further object of the invention is that said 3D printing apparatus and a method of using said apparatus can be realised with substantially low costs, both with regard to production costs and operating costs.

Yet another aim of the invention is to propose a 3D printing apparatus of the bottom-up photo-curing type with variable refractive index rotary glass and an associated method of use that is simple, safe and reliable.

A first specific object of the invention is therefore a 3D printing apparatus of the bottom-up photo-curing type, comprising at least one source of a radiation designed to obtain the photo-curing of a liquid photo-curing material, above which is arranged a tank containing said liquid photo-curing material and inside which is immersed at least one extraction plate, provided with means of displacement with alternating rectilinear motion, along a direction perpendicular to the bottom of said tank, from a position at a distance from the bottom of said tank equal to the thickness of a layer which can be obtained by the photo-curing of said liquid photo-curing material, the bottom of said tank comprising an elastic membrane of non-stick material and transparent to the radiation of said light source, said tank being placed on a support plate, wherein said support plate comprises, in the portion below the bottom of said tank, a movable support element, designed to move by translating and/or rotating in the plane in which it is positioned, which, alternatively
- is made entirely of the same material that is transparent to the radiation used for photo-curing, with one or more portions perforated or lowered from its upper surface, of a size equal to the size of the printing area, or
- alternates, at regular intervals, a portion of material transparent to the radiation used for photo-curing, of a size equal to the size of the printing area, and a perforated portion or a portion lowered with respect to its top surface, of a size equal to the size of the printing area, the movable support element being able to comprise more than one portion of material transparent to the radiation used for photo-curing and the same number of perforated or lowered portions.

Preferably, according to the invention, said material transparent to the radiation used for photo-curing is borosilicate glass or quartz.

In particular, according to the invention, said movable support element may be a support disc with a possibility of rotation about its centre.

Preferably, according to the invention, when said movable support element alternates more than one portion of material transparent to the radiation used for the photo-curing and a same number of perforated or lowered portions, each portion of material transparent to the radiation used for the photo-curing is formed by an opening, covered by a sheet of material transparent to the radiation used the for photo-curing.

Moreover, according to the invention, when said movable support element alternates more than one portion of material transparent to the radiation used for photo-curing and the same number of perforated or lowered portions, preferably each portion of material transparent to the radiation used for the photo-curing has a different refractive index, the difference between the refractive indices being equal to the shift of the incident ray equal to the size of the pixel divided by the number of portions of material transparent to the radiation.

Alternatively, again according to the invention, when said movable support element is entirely made of the same material transparent to the radiation used for photo-curing, or said portions of material transparent to the radiation used for photo-curing are all made of the same material transparent to the radiation used for photo-curing, between said at least one source of a radiation designed to obtain the photo-curing of the liquid photo-curing material and said movable support element, a lens system with different refractive index is interposed, and preferably said lens system is provided with rotary or linear means of movement of the lenses with different refractive index.

Finally, according to the invention, the 3D printing apparatus may comprise a plurality of extraction plates and an equal number of sources of a radiation designed for obtaining photo-curing of the liquid photo-curing material.

A second specific object of the invention is a 3D printing method of the bottom-up photo-curing type, implemented by means of the apparatus defined above, and comprising the following steps:
- a) moving the movable support element to place under the extraction plate (20) a portion of the movable support element transparent to the radiation used for the photo-curing;
- b) lowering the extraction plate (20) to a position wherein the last cured layer, or in its absence the lower surface of said extraction plate (20), is at the distance of a layer to be formed with respect to said bottom (11) of the tank (10);
- c) proceeding with the irradiation and the generation of a cured layer of the object to be printed;
- d) moving the movable support element to place a perforated or lowered portion of the movable support element under the extraction plate (20); the bottom (11) of the tank (10) remains attached to said cured layer;
- e) lifting the extraction plate (20), with progressive detachment of the bottom (11) of the tank (10) from said cured layer;
- f) moving the movable support element to place under the extraction plate (20) the same or a different portion of the movable support element transparent to the radiation used for the photo-curing;
- then iteratively repeating the steps b)-f) until completion of the object to be formed.

BRIEF DESCRIPTION OF THE DRAWINGS

The invention is now described, by way of example and without limiting the scope of the invention, according to preferred embodiments, with reference to the accompanying drawings, in which.

DETAILED DESCRIPTION OF THE EMBODIMENTS

Referring preliminarily to FIGS. 1-4, the characterising elements of an apparatus for 3D printing of the bottom-up photo-curing type, with translatable or rotary glass having a variable refractive index according to the invention essentially comprise a tank 10 (which can be considered as a consumable element), with a bottom 11, transparent to the radiation of a light source 12 (or, more generally, of a source of a radiation designed to obtain the photo-curing of the photo-curing material), arranged under said tank 10. The tank 10 is arranged above a support plate 13, which has a movable support element, in particular a support disc 14 in the part below the bottom 11 of the tank 10.

In particular, the bottom 11 of the tank 10 consists of an elastic membrane of non-stick material.

The support disc 14 is mounted on a motor 15 which allows the rotation of the support disc 14 around its centre 16 and alternates, at regular angular intervals around said centre 16, three openings 17 covered by as many glass sheet, respectively a first glass sheet 18', a second glass sheet 18" and a third glass sheet 18'", said openings 17 having dimensions equal to the size of the printing area, and three perforated portions 19 (or three portions lowered with respect to the upper surface of the support disc 14), again having dimensions equal to the size of the printing area.

In particular, the glass of said glass sheets 18', 18", 18'" is a glass transparent to the radiation of said light source 12 used for the photo-curing and preferably is borosilicate glass or quartz.

Finally, the apparatus comprises an extraction plate 20 with a respective handling and support system 21, the extraction plate 20 being suitable for housing on its lower surface the first layer of the object to be printed, and for progressively extracting said object from the tank 10, with the alternative lifting and partial lowering movement typical of 3D printing systems of the bottom-up photo-curing type.

In the printing step, the support disc 14 is initially rotated in such a way that a first opening 17 is arranged under the extraction plate 20 with the respective first glass sheet 18', which is thus interposed between the elastic membrane of non-stick material forming the bottom 11 of the tank 10 and the light source 12 used for the photo-curing. Once in position, the irradiation and generation of the first layer of the object to be printed is performed. Having formed the first layer, the support disc 14 is rotated to a second position, in which a perforated portion 19 is arranged under the extraction plate 20 and the extraction movement of the extraction plate 20 is then carried out, in a condition wherein the elastic membrane of non-stick material forming the bottom 11 of the tank 10 behaves like a free-field membrane. At this point, the support disc 14 is rotated again, until a second opening 17 with the respective second glass sheet 18" is located under the extraction plate 20 for the formation of a second layer of the object to be printed. The process continues as described above, alternating, in the position below the extraction plate 20, an opening 17 covered by the respective sheet of glass and a perforated portion 19, until the printing of the object is completed.

Alternatively, the movable support element can be configured as a support plate, which is able to translate along a horizontal axis, consequently positioning, under the extraction plate, alternatively an opening covered by a glass sheet and a perforated or lowered portion. The same process as described above applies, with the exception that the movable support element translates rather than rotates.

It is clear that by using this method, the suction cup effect is not only contained, but definitively eliminated, like a suction cup attached to a glass, which instead of being deformed on one side to allow air to enter (peeling phenomenon), is actually moved to the edge of the glass. On this occasion, the perpendicular component, which opposes the detachment of the object from the elastic membrane, generating the suction cup effect, is effectively cancelled out.

In addition, the configuration of the 3D printing apparatus according to the invention is also particularly effective for a further technical effect. In fact, by moving the movable support element, for example the support disc 14, and keeping the bottom 11 of the tank 10, made of flexible non-stick material, stationary, no type of mechanical stress is generated on the lower surface of the last formed layer of the object being made, since during the step of moving the movable support element the newly cured layer and the membrane of non-stick material forming the bottom 11 of the tank 10 remain stationary. If, on the other hand, instead of the movable support element, the tank 10 is rotated, and with it the bottom 11 consisting of the flexible membrane of non-stick material, a mechanical stress is generated on the lower surface of the last formed layer due to sliding with respect to the membrane.

The 3D printing apparatus of the bottom-up photo-curing type according to the invention and a method of use thereof are thus configured as a new 3D printing technology, which allows the formation of objects without the generation of the suction cup effect, without the introduction of mechanical stress and in the absence of restrictions regarding the non-stick material to be used.

In addition, the 3D printing apparatus according to the invention can be conveniently adapted to intervene directly on the aliasing problem. In this respect, according to the invention it is proposed to vary the refractive index of the glass sheets used in the active part, by alternating the glass sheets 18', 18", 18'" having different refractive indexes, by a value equal to the shift of the incident ray equal to the pixel size divided by the number of glass sheets 18', 18", 18'" (resolution/N). In this way, for each printed layer, instead of introducing compression errors, with inevitable loss of resolution and geometric accuracy, while always maintaining the highest quality of each individual image, a surface is obtained with a roughness equal to 1/N and geometric accuracy always equal to the pixel.

Figure 1:
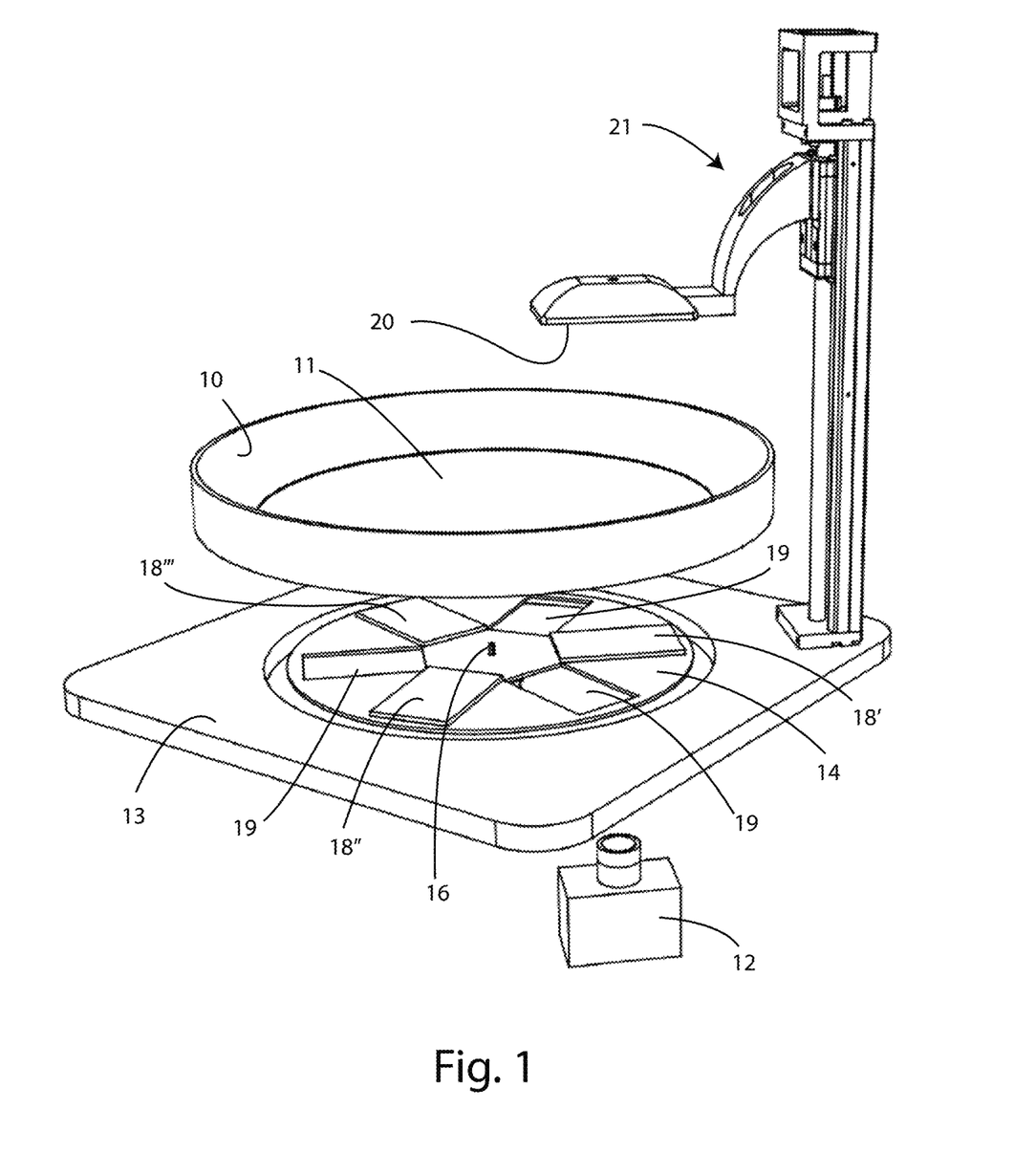
FIG. 1 shows a perspective view from above of a 3D printing apparatus of the bottom-up photo-curing type, with rotary glass with variable refractive index according to a first embodiment of the invention, with the tank raised with respect to the rest of the structure.
Figure 2:
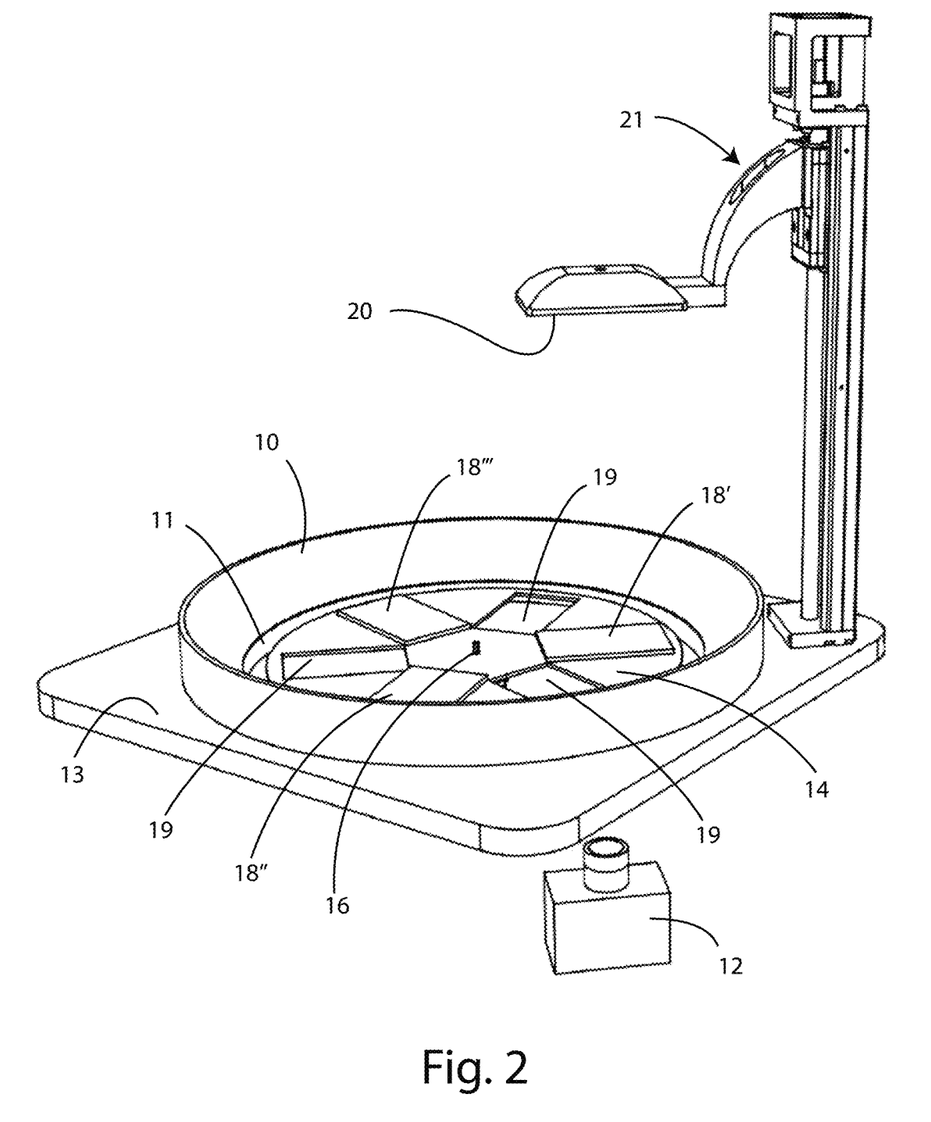
FIG. 2 shows a perspective view from above of the apparatus of FIG. 1, with the tank resting on the supporting plate.
Figure 3:
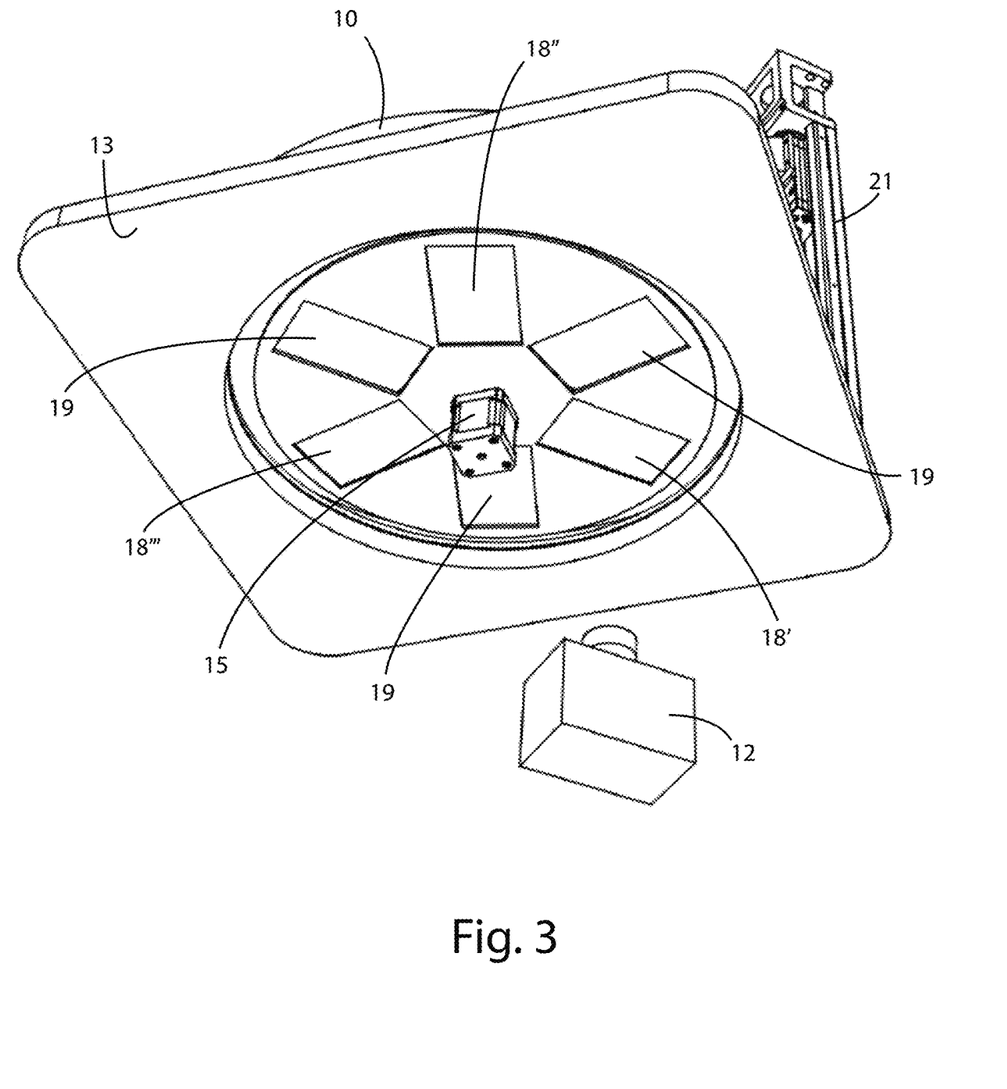
FIG. 3 shows a perspective view from below of the apparatus of FIG. 1.
Figure 4:
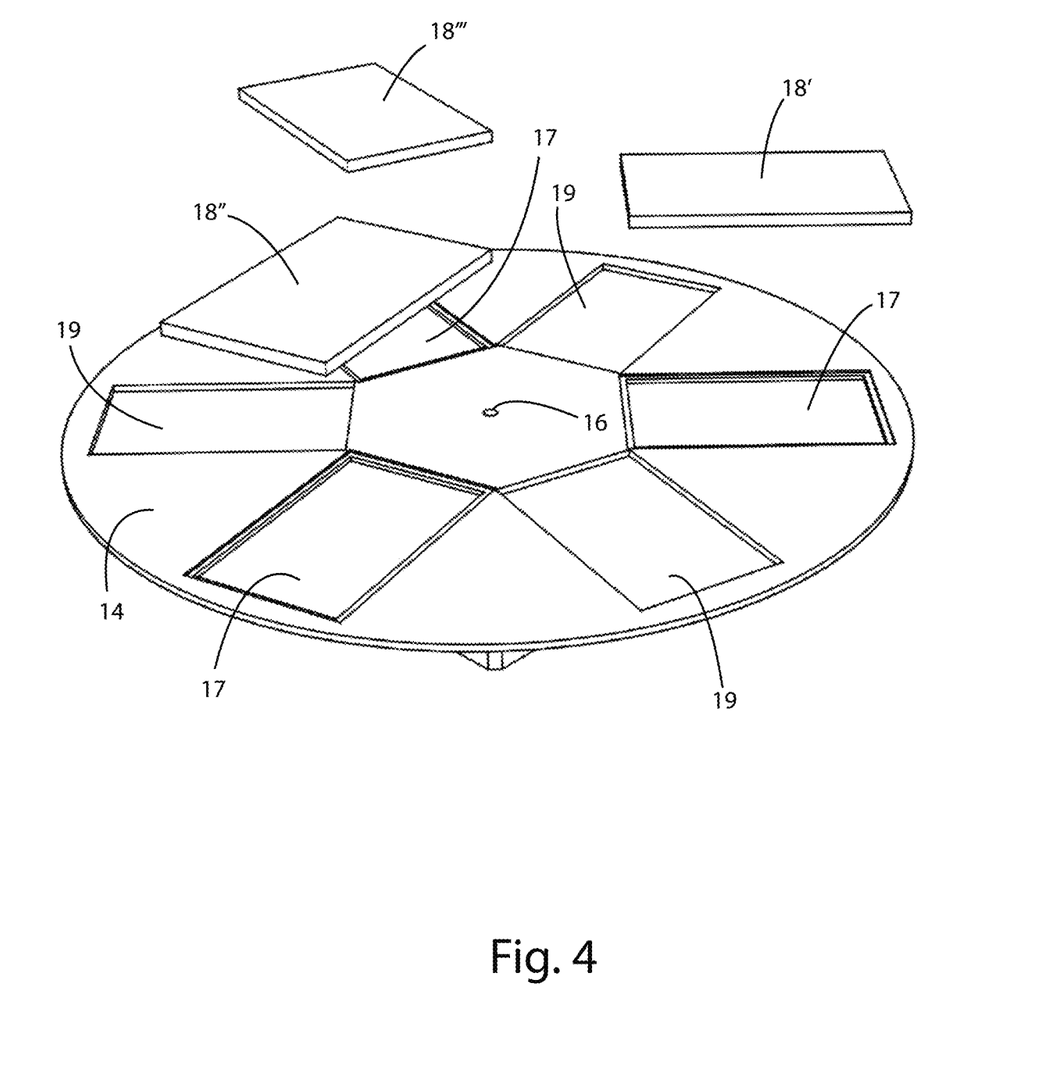
FIG. 4 shows an exploded view of the support disc of the apparatus of FIG. 1.
Figure 5:
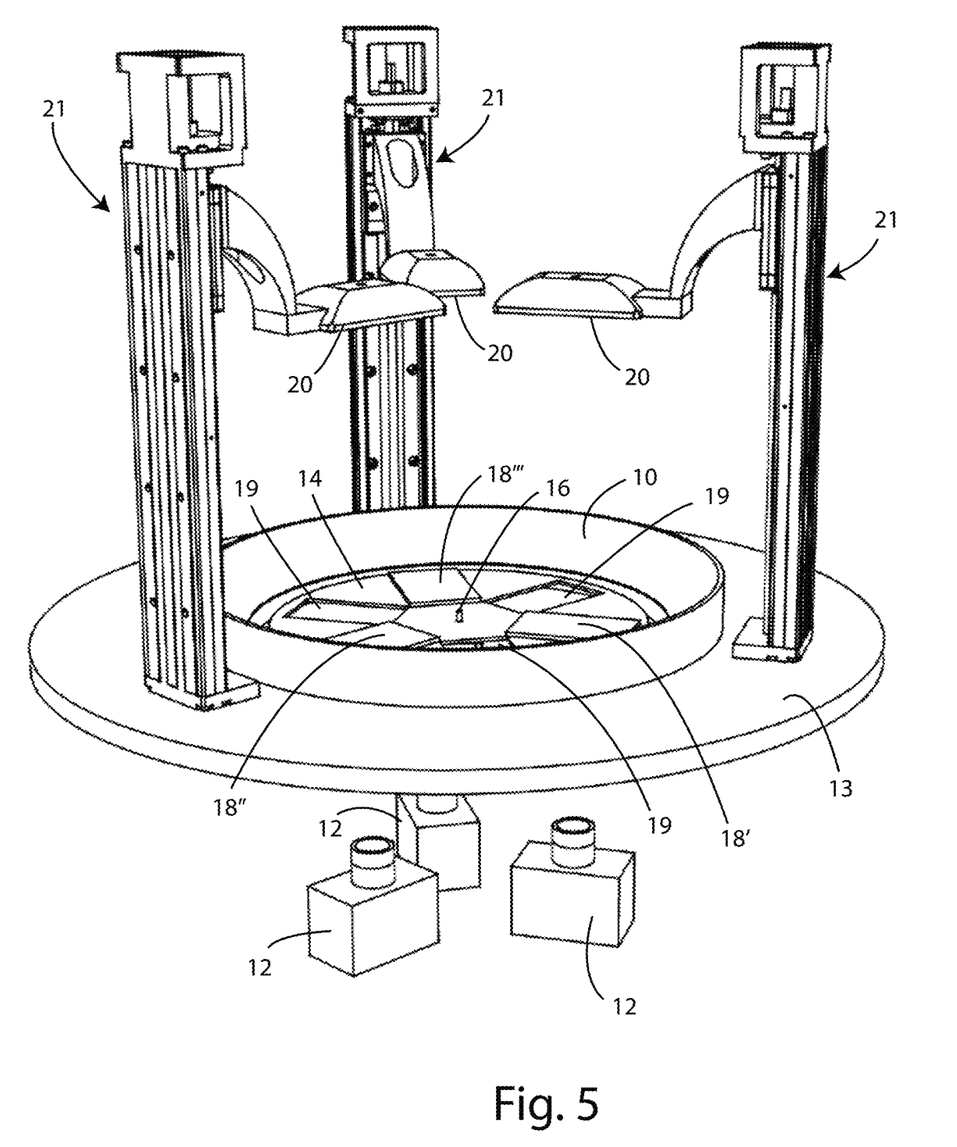
FIG. 5 shows a perspective view from above of a 3D printing apparatus of the bottom-up photo-curing type, with rotary glass with variable refractive index according to a second embodiment of the invention.

Moreover, referring to FIG. 5, a second embodiment of the 3D printing apparatus of the bottom-up photo-curing type with rotary glass with variable refractive index according to the invention is shown, wherein, taking advantage of the fact that several printing areas are simultaneously present, as many extraction plates are correspondingly arranged to print several objects simultaneously.

In particular, FIG. 5 shows a 3D printing apparatus of the bottom-up photo-curing type, with rotary glass with variable refractive index according to an embodiment of the invention wherein there are three extraction plates 20, each with a respective handling and support system 21, to take full advantage of the presence on the support disc 14 of three openings 17, covered by respective glass sheets 18', 18", 18'".

The technology according to the invention can be implemented according to different embodiments, not shown in the drawing but all falling within the same inventive concept.

In particular, according to a further embodiment, the rotating support disc is replaced by a support plate, which is able to translate along a horizontal axis, consequently positioning under the extraction plate alternatively an opening covered by a glass sheet and a perforated or lowered portion.

Moreover, according to a further embodiment, a lens system with a different refractive index is interposed between the light source and the glass sheet on which the layers of the object being printed are formed, the lens system being equipped with rotary or linear means of handling lenses with different refractive indexes.

The 3D printing apparatus of the bottom-up photo-curing type with variable refraction index rotary glass according to the invention achieves a number of advantages over prior art solutions.

Firstly, thanks to the 3D printing apparatus of the bottom-up photo-curing type with variable refraction index rotary glass according to the invention it is possible to achieve a total cancellation of the suction cup effect. In fact, by keeping the tank fixed with respect to the object being printed and moving the support system positioned underneath the bottom of the tank to alternate between areas of the support system that are transparent to the radiation used for photo-curing and areas that are perforated or lowered, the mechanical stress on the newly cured layer is completely eliminated.

Having eliminated the suction cup effect between the support system and the bottom of the tank made of non-stick material, the only effect that remains effective is the adhesion between the non-stick material and the last cured layer, which can be varied according to the type of non-stick material used, so as to obtain different behaviour during the detachment step.

Moreover, thanks to the 3D printing apparatus of the bottom-up photo-curing type with variable refraction index rotary glass according to the invention it is possible to achieve a substantial reduction in the aliasing effect. In fact, working with glass supports with different refractive indices, it is possible to introduce a shift of the incident light beam within the pixel size, which allows the geometric accuracy to be maintained within the pixel, with a simultaneous reduction in roughness, equal to a fraction of the number of indices introduced.

Finally, again as a result of using the technology underlying the 3D printing apparatus of the bottom-up photo-curing type, with variable refractive index rotary glass according to the invention, it is possible to simultaneously print a plurality of objects in the same tank, each object at a different printing area, at which a corresponding extraction plate is arranged, simply by adding a corresponding number of light sources.

The invention is described by way of example only, without limiting the scope of application, according to its preferred embodiments, but it shall be understood that the invention may be modified and/or adapted by experts in the field without thereby departing from the scope of the inventive concept, as defined in the claims herein.

The invention claimed is:

1. A 3D printing apparatus of the bottom-up photo-curing type, comprising:
    at least one source of radiation capable of obtaining the photo-curing of a photo-curing liquid material;
    a tank, arranged above the at least one source of the radiation, containing the photo-curing liquid material, the tank being placed on a support plate; and
    at least one extraction plate immersible inside the tank, provided with moving means with alternating rectilinear motion; along a direction perpendicular to the bottom of the tank from a position at a distance from the bottom of the tank equal to the thickness of a layer obtainable by photo-curing of the photo-curing liquid material, the bottom of the tank being constituted by an elastic membrane of an anti-adherent material which is transparent to the radiation of the light source;
    wherein the support plate comprises, in the portion below the bottom of the tank, a movable support element, configured to move by translating and/or rotating in the plane in which it is positioned, which, alternately:
        is made entirely of a same material transparent to the radiation used for the photo-curing, with one or more portions perforated or lowered with respect to an upper surface of the movable support element, of a size equal to a printing area size, and includes a system of lenses having different refractive indexes interposed between the at least one source of radiation and the movable support element; or
        alternates, at regular intervals, a portion of a material transparent to the radiation used for the photo-curing, of a size equal to the printing area size, and a portion perforated or lowered with respect to the upper surface of the movable support element, of a size equal to the printing area size, the movable support element being able to comprise more than one portion of the material transparent to the radiation used for photo-curing and a same number of perforated or lowered portions, wherein each portion of material transparent to the radiation used for photo-curing has a different refractive index, the difference between the refractive indexes being equal to the shift of the incident ray equal to the pixel size divided by the number of portions of material transparent to the radiation.

2. The 3D printing apparatus according to claim 1, wherein the material transparent to the radiation used for photo-curing is borosilicate glass or quartz.

3. The 3D printing apparatus according to claim 1, wherein the movable support element is a support disk rotatable around its center.

4. The 3D printing apparatus according to claim 1, wherein, when the movable support element alternates more than one portion of the material transparent to the radiation used for photo-curing and a same number of perforated or lowered portions, each portion of the material transparent to the radiation used for photo-curing being formed by an opening; covered by a plate of the material transparent to the radiation used for photo-curing.

5. The 3D printing apparatus according to claim 1, wherein, when the system of lenses with different refractive indexes is interposed between the at least one source of radiation and the movable support element, the system of lenses is provided with a rotary-type or linear-type means of movement of the lenses with different index of refraction.

6. The 3D printing apparatus according to claim 1, wherein the apparatus comprises a plurality of extraction plates and an equal number of sources of radiation.

7. A 3D printing method of the bottom-up photo-curing type, implemented by the apparatus of the claim 1, comprising the following steps:
    a) moving the movable support element so as to arrange, below the extraction plate, a portion of the movable support element that is transparent to the radiation used for photo-curing;
    b) lowering the extraction plate to a position where a last cured layer of an object to be printed, or, in an absence thereof, the lower surface of the extraction plate, is at a distance of one layer to be formed with respect to the bottom of the tank;
    c) proceeding with the irradiation and the generation of the one cured layer of the object to be printed;
    d) moving the movable support element to arrange, below the extraction plate, a perforated or lowered portion of the movable support element; the bottom of the tank remaining attached to the cured layer;
    e) lifting the extraction plate, with a progressive detachment of the bottom of the tank from the hardened layer;

f) moving the movable support element to arrange, below the extraction plate, the same or a different portion of the movable support element that is transparent to the radiation used for photo-curing;

e) iteratively repeating steps b)-f) until the completion of the object to be printed.

\* \* \* \* \*